G. CAMPBELL.
STONE CUTTING AND DRESSING MACHINES.
No. 195,701.          Patented Oct. 2, 1877.
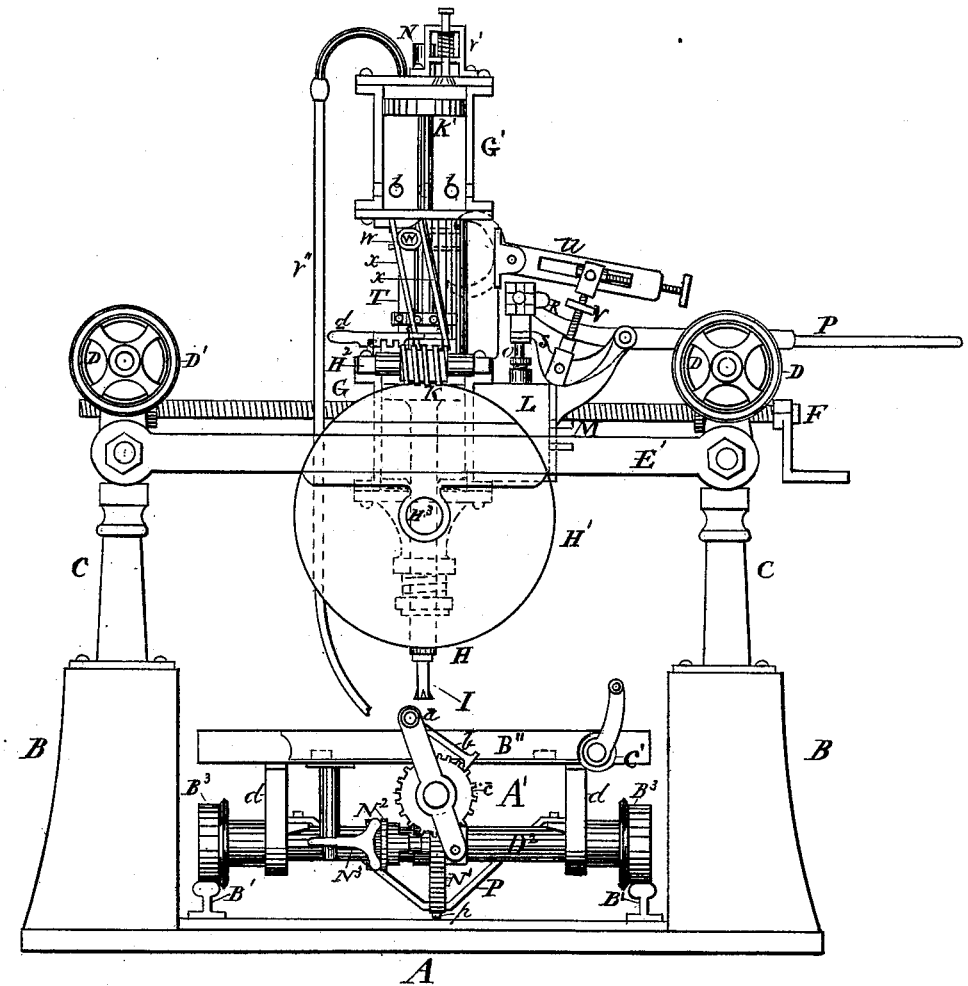

UNITED STATES PATENT OFFICE.

GEORGE CAMPBELL, OF TORONTO, ONTARIO, CANADA, ASSIGNOR OF ONE-THIRD OF HIS RIGHT TO WILLIAM ARTHUR PHIPPS, OF SAME PLACE.

IMPROVEMENT IN STONE CUTTING AND DRESSING MACHINES.

Specification forming part of Letters Patent No. 195,701, dated October 2, 1877; application filed May 4, 1877.

*To all whom it may concern:*

Be it known that I, GEORGE CAMPBELL, of the city of Toronto, in the county of York, in the Province of Ontario, machinist, have invented certain new and useful Improvements in Stone Cutting and Dressing Machines; and I do hereby declare that the following is a full, clear, and exact description of the same.

My invention relates to machinery operated by steam or air for cutting and dressing stone after it has been separated from that in the quarry. The block is placed upon a truck with wheels suitable for running on a track formed of ordinary iron or other rails, which rails may form a line of railway leading from the quarry in which the stone is obtained to the machine which forms the subject of my invention, and which I shall now proceed to describe.

On the bed of my machine, which may be made of any suitable material, are fastened two iron or other rails, which, when the machine is in working position, shall correspond in gage and line to a railway running to the quarry, so that a truck from the same will run onto the bed of the machine, and be thereon secured in position, so that a stone placed upon the truck can be operated upon by my cutting and dressing device.

On one of the axles of the truck is placed a worm-wheel, which runs loosely on the same, the said wheel having a hub with a half-clutch coupling formed therein, and on the axle is placed a corresponding portion or other half of the said clutch-coupling, which slides on a feather sunk in the axle, and is operated by a lever. By means of this clutch-coupling the truck is either free to move slowly on the bed, from the action of the worm-wheel, in accordance with the requirements of the cutting device, or when the clutch is disengaged it is free to move onto the railway, and thence to the quarry for another block, to be similarly operated upon in its turn.

While the stone is under the operation of dressing it can receive motion with the truck in a lateral direction from the worm and worm-wheel, and the cutting device, with the steam-cylinder and its machinery, receives motion in a longitudinal direction by means of mechanism specially adapted therefor.

The cutting device, with steam-cylinder, can also be placed to operate at any required angle, for chamfering and the dressing of angular blocks.

The stone, while under operation, has also a circular motion when required, which is derived from a circular face-plate, operated also by a worm geared into the periphery of the same, by means of which fluted columns can be cut out of the solid block by drilling holes round the circumference of a circle when the block is placed in position therefor.

In the accompanying drawings the same letters of reference indicate the same parts in all the views, and in this specification the figure is a side view of my machine, in which—

A is the floor of the bed thereof; B B, pedestals, on which are placed four columns, C C C C; D D, bevel-wheels placed on cross-shafts, and meshing into similar bevel-wheels placed on top of screws in columns C C, for raising and lowering the cross-rails resting on the same; $D^1 D^1$, hand-wheels for operating the bevels D D; E' E', longitudinal top rails on which the engine slides when operated by the screw and handle F. These rails E' E' have oblong holes in the ends, to admit of an inclined position for dressing tapered stones. A', the truck; B'', face-plate which forms a worm-wheel, and c' a worm which operates the same; $D^2$, axle; $N^1$, a worm-wheel with clutch on same, and operated by a similar clutch, $N^2$, and lever $N^3$ on axle $D^2$. A worm operates a worm-wheel by means of handle a, reversing-pawl b, and ratchet-wheel c. P, a strong iron cross, its extreme points resting on the brackets d d, forming the axle journal-boxes, which, by means of a screw, p, supports a portion of the weight of face-plate B'', which face-plate revolves also upon suitable rollers specially adapted therefor.

Having now described my invention, I claim—

1. A foundation or bed, A, with two rails, B' B', and two pedestals, B B, columns C C C C and screws therein, and bevel-wheels D D on top of same, and operated by other bevel-wheels D D on cross-shafts, and hand-wheels $D^1 D^1$, as specified and described, and for the purposes set forth.

2. A truck, A', with wheels $B^3$, corresponding in gage to the rails B' B', a face-plate, B'', its periphery making a worm-wheel, and operated by the worm c', also a worm-wheel, N¹, as placed on the axle D², having a clutch formed in its hub, and locked and unlocked by a corresponding clutch, N², sliding on a feather in the aforesaid axle D² by means of a handle, N³, for this purpose, the iron cross P, with adjusting-screw p, the worm N⁴, which operates the worm-wheel N¹ by means of the handle a, and reversing-pawl b for ratchet-wheel c, the whole in combination, as shown and described, and for the purposes set forth.

3. The cross-rails E E, adapted to be raised and lowered by the cross-shafts and bevel-wheels D D, as set forth.

4. The top rails E' E', as constructed with oblong bolt-holes, for allowing the said rails to be raised and lowered and placed in an inclined position, for dressing tapered stones, as set forth.

GEORGE CAMPBELL.

Witnesses:
WILLIAM GILL,
THO. MOLTHIDGE.